(12) United States Patent
Haarlemmer

(10) Patent No.: US 9,869,514 B2
(45) Date of Patent: Jan. 16, 2018

(54) SLUDGE DRYING METHOD AND INSTALLATION

(75) Inventor: Geert Haarlemmer, Montbonnot Saint Martin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 453 days.

(21) Appl. No.: 13/813,771

(22) PCT Filed: Aug. 5, 2011

(86) PCT No.: PCT/EP2011/063565
§ 371 (c)(1),
(2), (4) Date: Feb. 1, 2013

(87) PCT Pub. No.: WO2012/017092
PCT Pub. Date: Feb. 9, 2012

(65) Prior Publication Data
US 2013/0125412 A1 May 23, 2013

(30) Foreign Application Priority Data

Aug. 6, 2010 (FR) ..................................... 10 56490

(51) Int. Cl.
*F26B 3/084* (2006.01)
*F26B 23/00* (2006.01)
(Continued)

(52) U.S. Cl.
CPC ............. *F26B 23/004* (2013.01); *C02F 11/12* (2013.01); *F26B 1/00* (2013.01); *F26B 3/205* (2013.01);
(Continued)

(58) Field of Classification Search
CPC ...... F26B 23/00; F26B 23/001; F26B 23/002; F26B 23/004; F26B 23/005;
(Continued)

(56) References Cited

U.S. PATENT DOCUMENTS 1,446,054 A * 2/1923 Maus ............................... 34/468
4,145,007 A * 3/1979 Jetzer ........................ B03B 9/061
241/152.2
(Continued)

FOREIGN PATENT DOCUMENTS

| DE | 1604992 B | 4/1970 |
| FR | 463633 A | 2/1914 |
| GB | 2019541 A | 10/1979 |
| WO | 98/40681 A1 | 9/1998 |
| WO | 2006/095010 A1 | 9/2006 |
| WO | 2009/040919 A1 | 4/2009 |

OTHER PUBLICATIONS

International search report for PCT/EP2011/063565 dated Oct. 25, 2011.

*Primary Examiner* — John McCormack
(74) *Attorney, Agent, or Firm* — Pearne & Gordon LLP

(57) ABSTRACT

This sludge drying device is characterised in that a gas entraining a mix of sludge and sand is recycled after drying (6) and separation (8) to be compressed (10) and circulate again through the dryer (6) acting as a heat exchange fluid. Compression has been performed to increase the dew point temperature of the gas containing the evaporated moisture, such that the latent heat of evaporation can be recovered by the drying gas. The required operating power can then be much lower than the required power for evaporating the moisture contained in the sludge, because most of this power is recovered.

13 Claims, 5 Drawing Sheets

(51) Int. Cl.
*C02F 11/12* (2006.01)
*F26B 1/00* (2006.01)
*F26B 3/20* (2006.01)
*F26B 17/10* (2006.01)
*C02F 11/14* (2006.01)

(52) U.S. Cl.
CPC ............ *F26B 17/106* (2013.01); *C02F 11/14* (2013.01); *C02F 2303/02* (2013.01); *C02F 2303/10* (2013.01); *F26B 2200/18* (2013.01); *Y02B 30/52* (2013.01); *Y02P 70/405* (2015.11); *Y02W 10/30* (2015.05)

(58) Field of Classification Search
CPC ........ F26B 2200/18; F26B 3/04; C02F 11/12; C12M 47/14; C12M 47/20
USPC ... 34/477, 86, 467–471, 476, 359, 360, 182, 34/183, 236, 362, 363, 367, 370, 372, 34/373; 165/104.16, 157
See application file for complete search history.

(56) References Cited

U.S. PATENT DOCUMENTS

| | | | |
|---|---|---|---|
| 4,153,411 A | 5/1979 | Isheim | |
| 4,287,877 A * | 9/1981 | Gaines | F24D 5/005 126/514 |
| 5,069,801 A | 12/1991 | Girovich | |
| 5,215,670 A | 6/1993 | Girovich | |
| 5,318,184 A * | 6/1994 | Krebs | 209/21 |
| 5,343,632 A * | 9/1994 | Dinh | F26B 21/086 34/507 |
| 6,058,619 A * | 5/2000 | Krebs | F26B 23/022 34/79 |
| 6,161,305 A * | 12/2000 | Maier | C02F 11/12 34/221 |
| 6,470,595 B1 * | 10/2002 | Gaiser | B01J 2/16 34/359 |
| 2006/0101663 A1 * | 5/2006 | Perin | F26B 23/02 34/396 |

* cited by examiner

SLUDGE DRYING METHOD AND INSTALLATION

TECHNICAL DOMAIN

The invention relates to a sludge drying method and installation.

There is an increasing need for treatment and interim storage of sludge originating particularly from waste water treatment plants. The treatment may include incineration but this requires large quantities of energy due to the moisture content of the sludge. This is why incineration is often replaced or preceded by drying in order to reduce the moisture content in the sludge and thereby make it more combustible. However, drying itself consumes a large quantity of energy, known methods consuming between 120% and 180% of the latent heat for evaporation of water in general. In current methods, wet sludge is transported on a conveyor belt, on a disk or a drum and a hot gas flow is passed over it. The heating energy may be provided to the drying gas by a furnace operating using natural gas, and dried sludge and a mist composed of the drying gas and water vapour are obtained; the heat energy of these products is very difficult to recover.

Document U.S. Pat. No. 4,153,411 describes a method in which wet sludge is mixed with a granular material such as previously heated sand. The intimate mix between wet sludge and sand facilitates evaporation of water, since heating occurs through the sand. The dried sludge and sand are separated after drying in a standard device such as a cyclone, and the sand can be recycled. Another advantage of this design is that the transport of sludge through the installation is easier, since the sand makes the mix less sticky and therefore less bonding to the walls of the transport ducts. However, there are still difficulties in satisfactorily recovering heat, and therefore this method is not more economic than others.

Another known sludge drying device is marketed by the GEA company under the name "Superheated Steam Drying", and is composed of a steam loop into which the wet sludge is injected. During drying, the steam is heated by an external heating means. The dried sludge is recovered in a cyclone, while the gas transporting the dried sludge is superheated and then recompressed so that it can be mixed again with wet sludge.

The purpose of the invention is to improve known methods and installations in this technical field, while recovering heat used for evaporation to work with a much more moderate external heat flux.

One aspect of the invention is a continuous sludge drying method comprising a mix of wet sludge with a divided solid material in a gas flow, sufficient heating of the mix to dry the sludge by evaporating the moisture contained in the sludge into the gas, and then separation of the dried sludge from the wet gas and divided solid material, characterised in that the gas that has become wet is compressed resulting in an increase in the temperature such that condensation of the moisture contained in the gas is used to heat the next portion of mix.

A dryer according to the invention comprises a cold circuit inside which gas (then called DRY gas), the wet sludge and the divided material circulate. As the sludge circulates in the cold circuit, its moisture evaporates so well that sludge on the downstream side of the dryer is dry and the gas is wet. This cold circuit is heated by a hot circuit in which said wet gas circulates after having been firstly separated from the sludge and the divided material and secondly compressed. The gas is then compressed and is in the wet state.

One essential characteristic of the invention is that compression of the wet gas increases the dew point of the water vapour. Thus, when wet gas (WET) enters into the hot circuit of the dryer, the vapour is in contact with the cold circuit wall (cold wall) the temperature of which is less than the dew point of the vapour. The vapour then condenses on the cold wall so that latent heat for evaporation is recovered, and can then be used to heat the gas (DRY) circulating in the cold circuit, making it warm enough so that it can be used for drying the sludge. In the cold circuit, the mix composed of the gas (DRY), the wet sludge and the dispersed material is kept at a sufficiently low pressure so that the moisture in the sludge evaporates, wetting the gas and drying the sludge. The drying method can be maintained with a low external heat input, from 20% to 50% of the latent heat for evaporation of the water, more precisely about 30% in good embodiments of this invention. The advantage of the compression of hot wet gas (WET) is to increase the dew point until it is above the temperature of the cold circuit of the dryer.

It is compatible with the spirit of the invention that after heating, the gas should be dried and recycled by incorporating it in a following second portion of mix, so as to inject this heat into the mix before drying it, rather than to lose the remaining heat in the gas. The result then obtained is a completely closed gas circuit that avoids bad smelling effluents. It is then possible to choose the gas, such as a neutral gas. The dried gas can then advantageously be heated before returning to this portion of mix.

Another favourable effect of this dried gas is that it can be used to entrain the mix through a sludge drying location as far as the separation location. In other words, the gas is used as a pneumatic transport means for the sludge mixed with a divided material.

Another aspect of the invention is a sludge drying installation comprising a mixer of wet sludge and divided solid material, a gas flow injector (DRY), a sludge dryer, a dried sludge separator, divided solid material and gas that has become wet (WET), a means of transporting the mix between the mixer and the separator through the dryer, characterised in that this installation comprises a duct between the separator and the dryer followed by the gas that has become wet (WET), a compressor being present between the separator and the dryer, the dryer being a heat exchanger between the wetted gas (WET) and the mix. The duct with the compressor can transfer wet gas (WET) to a dryer shell or hot circuit, in which part of its moisture condenses in contact with the cold circuit, so as to use the heat recovered by the gas to dry the sludge, as described above.

The duct can connect the dryer to the injector to recycle the gas, passing through a wetting device. This device condenses part of the moisture in the gas on the outlet side of the dryer.

The injector may be located at an outlet from the mixer, and if the mix transport means consists of a gas blower duct, the installation may be designed such that the recycled gas can be used to entrain the mix. In one advantageous arrangement of the blower duct, the duct is divided into several adjacent ducts, at least through the dryer, and the duct along which the wetted gas passes forms a shell surrounding the gas blower duct; the heat exchange is then particularly easy due to the large total surface area of the tubes. Note that the division of the blower duct into thin tubes facilitates flow guidance and uniformity of entrainment. The presence of a divided solid material such as sand also facilitates fragmentation of the mix, its flow in the tubes and regular cleaning of tube walls. This entrainment of the mix by blowing, even if blowing is only done downstream from the location at which the mix of sludge and solid divided material reaches the blower duct(s) through the reaction vessel and until separation of the mix, is another important characteristic of the invention that guarantees a high treatment capacity, in the same way as the division of the duct into tubes. Since the divided solid material in the entrained material is predominant or very predominant compared with sludge, flow by pneumatic means is easier to achieve because evaporation of the mix is also easier.

In one important embodiment, the shell is divided into horizontally aligned compartments by baffles, each of the compartments being provided with a water drainage duct opening under the compartments and extending under the compartments. The division into baffles imposes a zigzag path on the heating gas that even further facilitates heat exchange, and much of the condensed moisture in the gas is deposited at the bottom of the shell from where it can be regularly removed.

Thus, as mentioned, a small quantity of external heat is necessary to maintain this method. Advantageously, it is planned that the only sources of external heat are a superheater of the mix between the dryer and the separator, a gas preheater between the wetting device, when there is one, and the injector, or both.

The invention will now be described in more detail with reference to the following figures.

Figure 1:
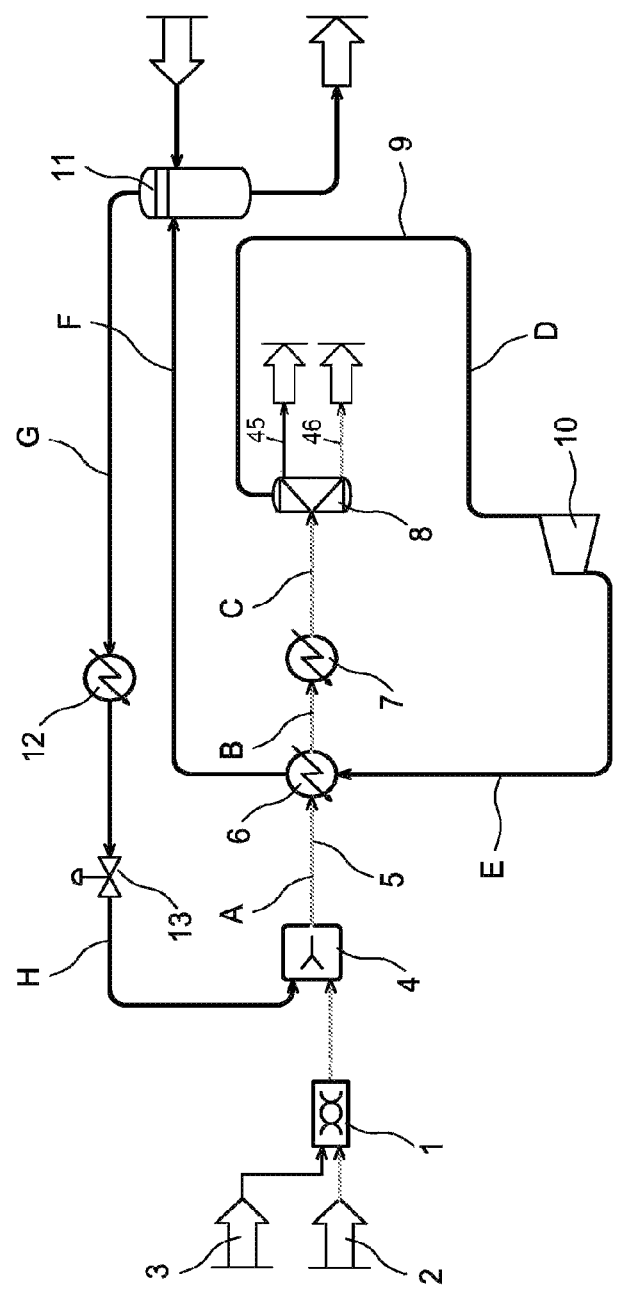
FIG. 1 is a general view of the installation.
Figure 2:
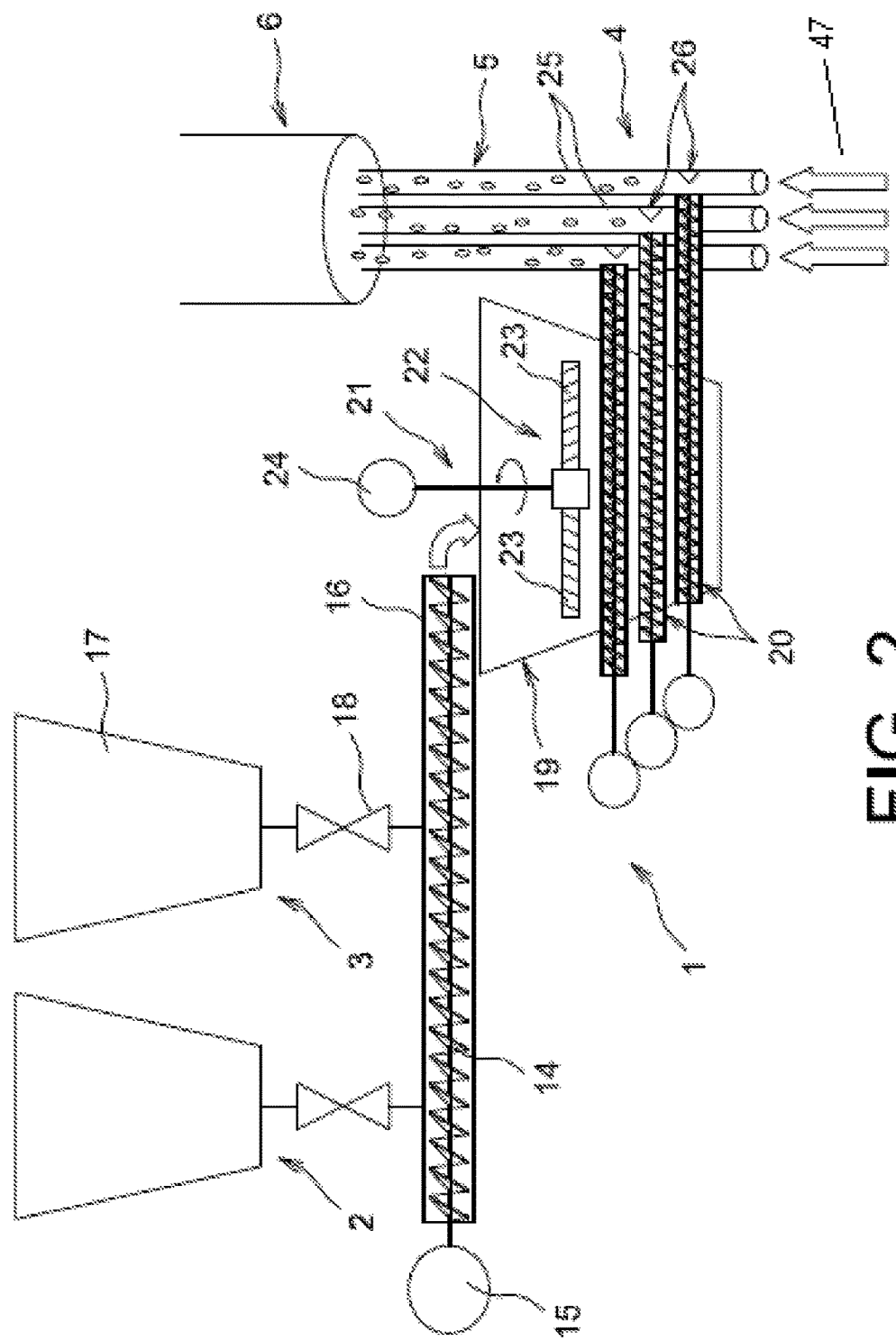
FIG. 2 shows a mixer and a corresponding embodiment of an injector.

We will start by describing FIG. 1. The installation comprises a mixer (1) into which the feeds (2 and 3) of the wet sludge and sand or other divided material enter, one injector (4) at the output from the mixer (1), and then in sequence working in the downstream direction following the path along which the mix (5) is transported, a dryer (6), a superheater (7) and a separator (8). A recycling duct (9) leads in sequence from the separator (8) to a compressor (10), and then the dryer (6), a wetting device (11), a preheater (12), a flow control valve (13), and finally the injector (4). Some of these devices and their layout will now be described in more detail. FIG. 2 thus shows the mixer (1) that consists of a worm screw (14) rotated by a motor (15) inside a duct (16) through which the feeds (2 and 3) pass to deliver sludge and sand between the threads of the screw (14). Each of the feeds (2 and 3) consists of a hopper (17) connected to the mixer (1) through a downstream control duct (18). The mix of wet sludge and sand formed in the screw (14) drops at the end of the screw into the injector (4), and firstly into a bin (19) from which it is continuously drawn off by delivery screws (20), with exactly the same structure as those (14) present in the mixer (1) but the function of which is to transport separate smaller continuous flows of the mix to the transport path (5). The bin (19) also comprises a mixing system (21) with a feed screw (22), rotating around a horizontal axis, located above the screws (20). The blades of the feed screw (22) are themselves rotating screws (23) that complete the mix and prevent arching, in other words the formation of voids above these screws. Thus, the rotating screws equalise the level of the mix. A motor (24) rotates the feed screw (22) and the screws (23). Other mixing devices could be imagined.

The delivery screws (20) extend to the bottom of the mixing bin (19) and outside it, and lead to thin and parallel blower ducts (25) to which they are orthogonal; the delivery screws (20) and the blower ducts (25) are advantageously horizontal. The injector (4) terminates at their intersections, and the transport path (5) corresponds to all blower ducts (25). Section restrictions (26) may be formed in the blower ducts (25) in front of the outlet from the delivery screws (20), to increase the velocity of the blowing gas and facilitate fragmentation of the mix and its entrainment by the gas. Blower ducts (25) originating from branch connections of the recycling duct (9), formed downstream from the control valve (13), carry the gas originating from the separator (8). The blower ducts (25) are advantageously straight to limit pressure losses, facilitate self-cleaning by sand or more generally the divided solid material, and to reduce wear, but they may easily be long.

Figure 3:
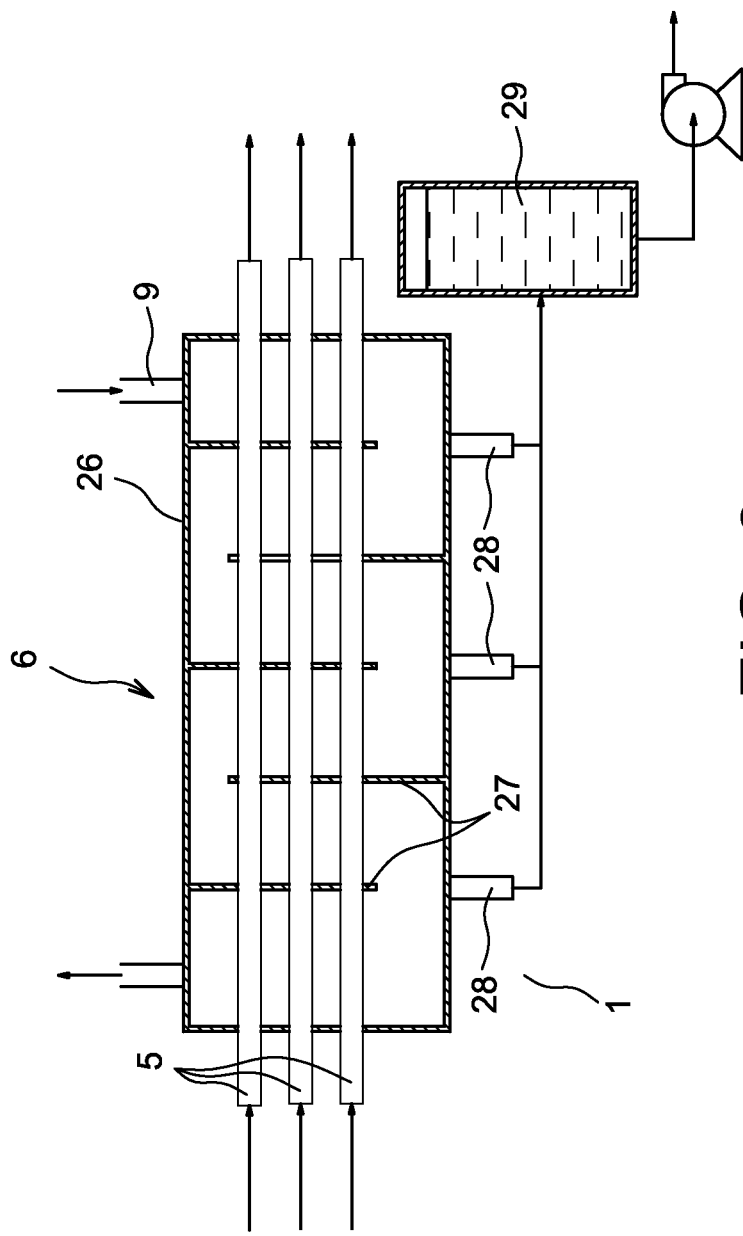
FIG. 3 shows an embodiment of the dryer.

Refer to FIG. 3. The blower ducts bench (25) passes through a shell (26) of the dryer (6) forming a heat exchanger with the shell. The shell (26) corresponds to a portion of the recycling duct (9), of which an upstream portion opens up at one end and a downstream portion opens up at the other end. Baffles (27) divide the inside of the shell (26) into compartments through which the gas passing through the recycling duct (9) passes successively, in contact with the blower ducts (25) and causing a heat exchange. Since the recycling gas is wet and loses most of its moisture by condensation in the shell (26), water runs off at the bottom and must be drained. Ducts (28) are provided for this purpose at the bottom of the compartments of the shell (26) and lead into a reservoir (29). Since there is a non-negligible difference in the pressure at the ends of the shell (26), the water levels (correlated to the level in the reservoir (29)) may be significantly different (for example 1 m for a pressure difference of 0.1 bars) such that it is essential to make sure that water deposited in the compartment furthest downstream does not interrupt the gas circulation or reach the blower ducts (25). The ducts (28) extending downwards from below the shell (26) make it possible to use a sufficiently deep reservoir (29) and avoid this problem.

Figure 4:
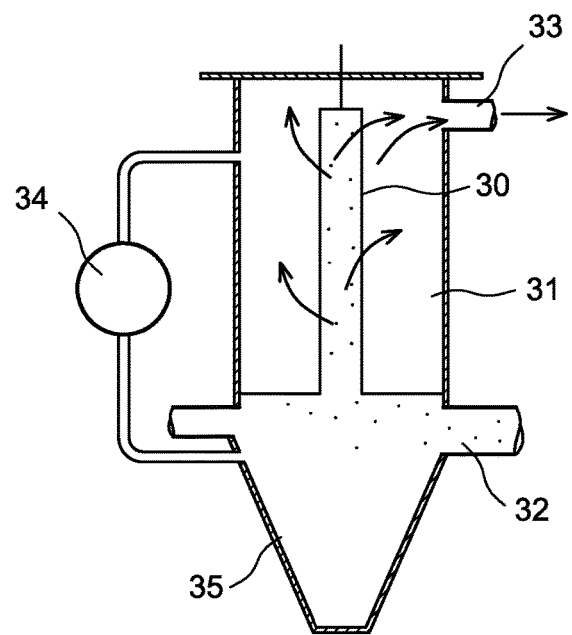
FIG. 4 shows a filter.

Other elements in the installation are already known and require no or very little description. We will mention that the separator (8) may comprise a cyclone to recover sand or other divided material (45), then a filter to collect dry sludge (46). The filter may be a flexible candle filter of a known type, comprising a porous flexible cylindrical membrane (30) as shown in FIG. 4, suspended in a reservoir (31). The mix of wet gas and dry sludge must pass through the membrane (30) by an upwards flow from an inlet duct (32) to an outlet duct (33). A pressurisation device (34) keeps the membrane (30) inflated and open. The wet gas passes through the membrane (30), but the sludge particles are retained in it. When the filter is clogged, the vacuum produced by the device (34) is stopped, the filter (30) collapses, and its content drops into a hopper (35) at the bottom of the reservoir (31) from where it can be collected. The recovered sand may be sent to the feed (3) automatically by a device such as a belt conveyor. The device may also be a closed circuit, sandy particles in the sludge being incorporated into the sand in the mix thus compensating for sand losses due to sand particles being embedded in the circuit.

The wetting device may be composed of a plate column or packed column inside which cold water runs. Hot gas (typically at 60°) originating from the hot circuit of the dryer, is injected into the bottom of the column and circulates in the opposite direction to the cold water flow. It then comes into intimate contact with the water which cools it to a temperature for example of the order of 30°. The absolute moisture of the gas at the exit from the wetting device has dropped, although its relative humidity is still approximately 100%. The superheater (7), the preheater (12), the compressor (10) and the valve (13) are ordinary elements. In particular, the superheater (7) may be composed of a casing through which a hot fluid (water or steam) passes, located at the exit from dryer (6) (FIG. 3).

We will now describe operation of the installation. The sand and wet sludge are mixed in the mixer (1), and the mix is supplied to the injector (4) where it is entrained in the form of a spray by an air flow (47). It is strongly heated in the dryer (6), such that the moisture in the sludge evaporates. The superheater (7) slightly increases the temperature of the mix and the gas so as to prevent any risk of recondensation in the separator (8), sticking of the solid material or clogging and more generally blockage of the blower ducts (25). The sand and the dry sludge are collected in the separator (8), the sand is recycled, the sludge is periodically removed and the gas now carrying the moisture from the sludge continues its cycle in the duct (9). It is sufficiently compressed by the compressor (10) so that the moisture can condense in it at a higher temperature than the temperature of the gas (DRY) circulating in the cold circuit of the dryer. The temperatures in the cold and hot circuits are different because water condenses at a higher temperature in the hot circuit due to the higher pressure. This temperature difference enables the heat contained in the hot and wet gas to be transferred to the mix circulating in the cold circuit, which entrains evaporation of the water present in the sludge. The two-phase mix is cooled through the dryer (6), and water that condensed on contact with the cold circuit is collected at the bottom of the shell (26). The wet gas is cooled by the wetting device (11) on the downstream side of the shell, which effectively reduces the absolute moisture content in this gas. This gas continues the cycle and is acted upon by the preheater (12), which has the effect of increasing the temperature and reducing the relative humidity of the gas. The gas finally returns to the injector (4) in which it entrains the next portion of mix of sand and wet sludge. The control valve (13) is useful to initiate the process, firstly being almost closed and then progressively opened. Typical values for an example installation would be a gas flow of 20 tonnes per hour, a dry sludge flow of 0.9 tonnes per hour, a moisture flow of 2.6 tonnes per hour, and a sand flow of 10 tonnes per hour. Sludge and sand enter at ambient temperature and pressure. The following is a table of temperatures and pressures occurring at the various sections of the installation, denoted A to H respectively, along the transport path (5) after the injector (4), the dryer (6), and the superheater (7), and then in the recycling circuit duct (9) after the separator (8), the compressor (10), the dryer (6), the wetting device (11), and the preheater (12).

TABLE I

| Section | A | B | C | D | E | F | G | H |
|---|---|---|---|---|---|---|---|---|
| Temperature (° C.) | 37 | 70 | 81 | 85 | 175 | 56 | 33 | 100 |
| p (bars) | 0.9 | 0.8 | 0.7 | 0.6 | 1.2 | 1.1 | 1 | 0.9 |

Heating generated by compression and recondensation of water vapour is notable, which enables a sufficient heat exchange to evaporate the moisture content of the next portion of mix. The vacuum in the transport path (5) facilitates the pressure drop while facilitating the use of a low quality heat source materialized by a hot fluid.

The velocity in the transport path (5) is 20 to 30 m per second. The number of bends will be limited. Bends will be made of hard concrete so as to reduce wear caused by sand. Blower ducts (5) may be composed of standard pipes with a diameter of about one inch. Their number will depend on the capacity of the dryer. There may be about a hundred, and the shell (26) may be cylindrical in shape with a diameter of one meter and a length varying from a few meters to a few tens of meters. The heat exchange surface area is about a hundred square meters for the dryer (6) and twenty-five square meters for the superheater (7). The circulation in the dryer (6) takes place in the opposite direction as shown in FIG. 3, consequently the heat exchange takes place under fairly uniform conditions along the length of the shell (26), the mix circulating in the cold circuit and the wet gas (WET) in mutual exchange usually having a temperature difference of approximately between 10 and 20° C. at all locations in the dryer (6), except at the wet gas inlet (WET) where this difference is larger.

Figure 7:
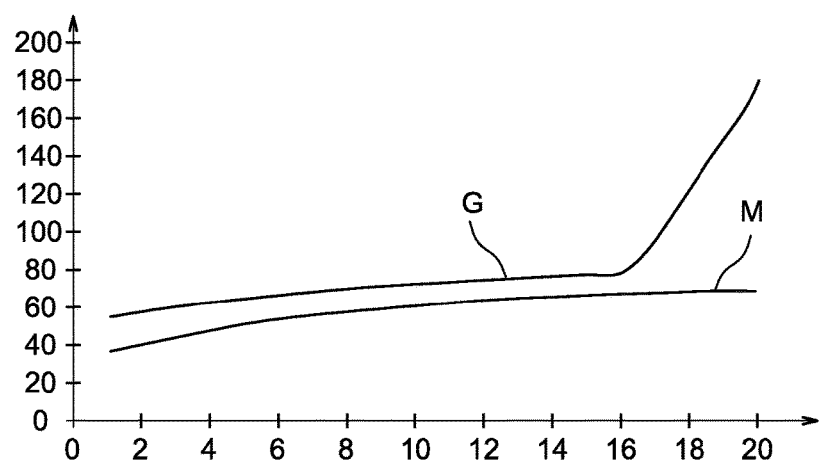
FIG. 7 shows the temperature change in the dryer of the wet gas circulating in the hot circuit, and the gas transporting the sludge circulating in the cold circuit.

FIG. 7 shows an example of the temperature change (in ° C.) of the mix (curve M) circulating in the cold circuit, and the hot and wet gas (curve G) circulating in the hot circuit, the dryer being assumed to be linear and about 20 meters long. The abscissa axis represents this length. As FIG. 7 shows, the mix circulates along the direction of increasing abscissa, while the hot and wet gas (WET) circulates in the opposite direction, along the direction of decreasing abscissa.

The entry of hot and wet gas (WET) into the hot circuit of the dryer causes sudden cooling (16<x<20), until the temperature reaches an inflection point (x=16), that then corresponds to the dew point of the water vapour. At between x=16 and x=0, the water vapour contained in the hot gas condenses in contact with the cold wall.

The mix gradually warms up as it progresses in the cold circuit.

The cyclone of the separator (8) is sized to separate 300 to 1000 micron sand particles from 50 to 200 micron sand particles in the dry sludge. The power of the compressor (10) could be 325 kW and the total power of the preheater and the superheater could be 200 kW. Less gas compression could be used with exactly the same heat exchange, if steam (possibly available elsewhere in the treatment plant) is injected into the shell (26) along the same path as the recycling gas through a feed duct (44). The recycling gas is advantageously an inert gas.

Another embodiment will now be described with reference to FIGS. 5 and 6; pneumatic transport of the sand and sludge mix is replaced by transport in a drum extending inside the dryer.

Figure 5:
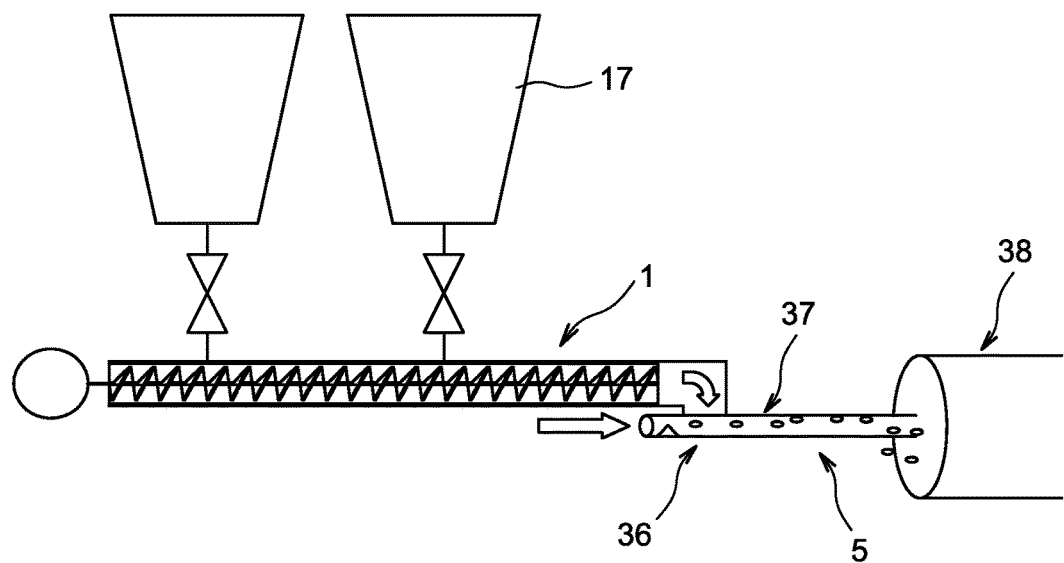
FIG. 5 shows another embodiment of an injector.
Figure 6:
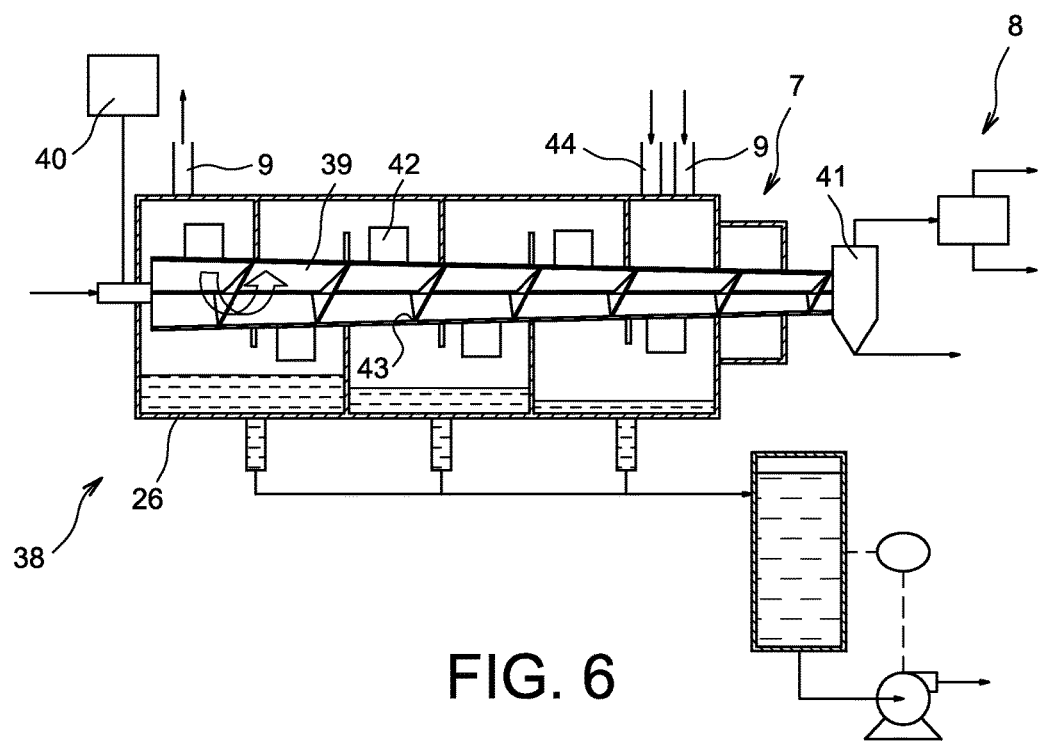
FIG. 6 shows another embodiment of a dryer.

FIG. 5 shows that in this case the injector (36) can then be simplified because the bin (19) and the delivery screws (20) are eliminated; the outlet from the screw of the mixer (1) directly enters a single blower duct (37) that in this case is the inlet to the transport path (5). As before, the blower duct (37) is in line with the recycling duct (9).

The dryer is reference (38). Apart from a shell (26) similar to that in previous embodiment, it comprises a drum (39) housed along the entire length of the shell inside the dryer, and that rotates about its own axis driven by a motor (40); it also extends through the superheater (7) as far as the cyclone (41) of the separator (8). The drum (39) may be about one meter in diameter and fifteen meters long; however, it is slightly conical in shape, tapering towards the cyclone (41) in order to increase the velocity of the blower gas so that a pneumatic transport is finally set up, transporting particles reaching the cyclone (41). Ribs (42) arranged outside the drum (39) contribute to giving the required heat exchange surface area of about a hundred square meters. A static internal screw type structure (43) moves the mix in translation. This embodiment has a simpler structure in general, but it has the disadvantage that it comprises a mobile part—the drum (39)—in the installation, which requires the addition of seals if it is required to prevent heat losses and limit smell nuisance. In any case, pneumatic transport by the hot gas is an efficient means of moving the mix while improving the heat exchange by preheating of the mix, and evaporation of moisture content due to fragmentation of the mix.

The invention claimed is:

1. Continuous sludge drying method, comprising a mix of a sludge with a divided solid material in a gas flow, sufficient heating of the mix to dry the sludge by evaporating a moisture contained in the sludge into the gas, thus drying the sludge and wetting the gas, and then a separation of the dried sludge from the wet gas and the divided solid material, wherein the wet gas is compressed resulting in an increase in temperature and is then used to heat a next portion of the mix by condensation of the moisture contained in said wet gas; and the mix is driven in a form of a spray by the gas flow during the drying of the sludge at a velocity of 20 to 30 meters per second (m/s), and the mix follows a divided flow through a plurality of blower ducts that pass through a dryer.

2. Sludge drying method according to claim 1, wherein the wet gas, after heating, is dried and recycled towards a second subsequent portion of the mix.

3. Sludge drying method according to claim 2, wherein the dried gas is heated before returning to the second subsequent portion of mix.

4. Sludge drying method according to claim 2, wherein the dried gas is used to entrain the mix through a sludge drying location as far as a separation location.

5. Sludge drying installation, comprising a mix of a wet sludge and a divided solid material, a mixer comprising an outlet, a gas flow injector, a sludge dryer, a separator of a dried sludge, the divided solid material, and a gas that has become wet, a means of transporting the mix between the mixer and the separator through the sludge dryer, wherein the installation comprises a duct connecting the separator to the sludge dryer which is followed by the gas that has become wet, a compressor being present between the separator and the sludge dryer, the sludge dryer comprising a heat exchanger between the wet gas and the mix, wherein the gas flow injector drives the wet sludge and the divided solid material in the form of a spray at a velocity of 20 to 30 meters per second (m/s), and the mix transport means comprises a plurality of blower ducts that pass through the sludge dryer.

6. Sludge drying installation according to claim 5, wherein the duct also connects the sludge dryer to the gas flow injector passing through a wetting device of the gas.

7. Sludge drying installation according to claim 5, wherein a shell surrounds the plurality of blower ducts.

8. Sludge drying installation according to claim 5, wherein the mix transport means further comprises a drum rotating in the sludge dryer, and the duct through which the gas that has become wet passes forms a shell surrounding the drum.

9. Sludge drying installation according to claim 7, wherein the shell is divided into horizontally aligned compartments by baffles, each of the compartments being provided with a water drainage duct opening under the compartments and extending under the compartments.

10. Sludge drying installation according to claim 5, wherein the sludge drying installation comprises a superheater of the mix between the sludge dryer and the separator, or a gas preheater between a wetting device of the gas and the injector, or both, as external heat sources.

11. Sludge drying installation according to claim 5, wherein the heat exchanger comprises a shell formed by the duct through which the gas that has become wet passes, wherein a water drainage duct opens under the shell.

12. Sludge drying method according to claim 1, wherein the plurality of blower ducts includes about one hundred blower ducts.

13. Sludge drying installation according to claim 5, wherein the plurality of blower ducts includes about one hundred blower ducts.

* * * * *